(12) United States Patent
Cha et al.

(10) Patent No.: US 8,576,671 B1
(45) Date of Patent: Nov. 5, 2013

(54) ABS DESIGN WITH MULTIPLE HEATERS

(71) Applicants: SAE Magnetics (H.K.) Ltd., Shatin N.T. (HK); Headway Technologies, Inc., Milpitas, CA (US)

(72) Inventors: Ellis Cha, San Ramon, CA (US); Ben Kwun Pan Ng, Hong Kong (HK)

(73) Assignees: SAE Magnetics (H.K) Ltd., Shatin, N.T. (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/708,119

(22) Filed: Dec. 7, 2012

(51) Int. Cl.
*G11B 11/00* (2006.01)
*G11B 5/147* (2006.01)

(52) U.S. Cl.
USPC ............... 369/13.02; 369/13.13; 360/125.74; 360/125.31

(58) Field of Classification Search
USPC .......... 369/13.33, 13.32, 13.24, 13.14, 13.03, 369/13.02, 13.12, 13.13, 13.22, 13.01, 369/13.35, 13.17, 112.27; 360/59, 125.31, 360/125.74, 125.75, 75, 128
See application file for complete search history.

(56) References Cited

U.S. PATENT DOCUMENTS

| | | | |
|---|---|---|---|
| 7,428,124 B1 | 9/2008 | Song et al. | |
| 7,430,098 B1 | 9/2008 | Song et al. | |
| 7,724,461 B1 * | 5/2010 | McFadyen et al. | 360/75 |
| 7,969,685 B2 | 6/2011 | Shen et al. | |
| 7,995,425 B2 * | 8/2011 | Schreck et al. | 369/13.13 |
| 8,064,156 B1 | 11/2011 | Suzuki et al. | |
| 8,081,398 B2 | 12/2011 | Hachisuka | |
| 8,154,826 B2 | 4/2012 | Hachisuka | |
| 8,264,512 B2 | 9/2012 | Mochizuki | |
| 2011/0128644 A1 | 6/2011 | Wallash | |

* cited by examiner

*Primary Examiner* — Ali Neyzari
(74) *Attorney, Agent, or Firm* — Saile Ackerman LLC; Stephen B. Ackerman

(57) ABSTRACT

A TAMR (thermal assisted magnetic recording) equipped DFH (dynamic flying height) type slider ABS design, when operating in a HDD (hard disk drive) produces exceptional low pressure/stiffness for improved touch down detection and back-off efficiency as well as wear and damage reduction due to the improved capabilities as well as reduction in heat transfers. The supplementation of the slider with multiple heaters, three herein, disposed about the write-head in the cross-track direction provides the slider with enhanced dynamic stability that would normally not be achievable with the exceptional low pressure/stiffness.

20 Claims, 4 Drawing Sheets

*Air Bearing Stiffness matrix of nominal pressure ABS design (ABS)*

| STIFFNESS MATRIX | | | |
|---|---|---|---|
| LOAD(G) | 0.189421E+00 | 0.943598E-01 | -0.153957E-03 |
| P-TORQUE(uH-M) | 0.832325E+00 | 0.537682E+00 | -0.243495E-02 |
| P-TORQUE(uH-M) | -0.162136E-02 | -0.185454E-02 | 0.152580E-01 |
| | HEIGHT(HM) | PITCH(uRAD) | ROLL(uRAD) |

*Air Bearing Stiffness matrix of low pressure ABS design (ABS5) with single heater*

| STIFFNESS MATRIX | | | |
|---|---|---|---|
| LOAD(G) | 0.117152E+00 | 0.497207E-01 | 0.137957E-02 |
| P-TORQUE(uH-M) | 0.423474E+00 | 0.280203E+00 | 0.543104E-02 |
| P-TORQUE(uH-M) | -0.217653E-02 | -0.146699E-02 | 0.173025E-01 |
| | HEIGHT(HM) | PITCH(uRAD) | ROLL(uRAD) |

*Air Bearing Stiffness matrix of low pressure ABS design (ABS5) with three heaters*

| STIFFNESS MATRIX | | | |
|---|---|---|---|
| LOAD(G) | 0.154029E+00 | 0.733607E-01 | -0.281120E-03 |
| P-TORQUE(uH-M) | 0.640026E+00 | 0.425537E+00 | -0.423798E-02 |
| P-TORQUE(uH-M) | -0.471645E-02 | -0.323260E-02 | 0.175061E-01 |
| | HEIGHT(HM) | PITCH(uRAD) | ROLL(uRAD) |

*FIG. 6*

ABS DESIGN WITH MULTIPLE HEATERS

RELATED PATENT

This Application is related to U.S. Pat. No. 7,969,685, filing date Aug. 13, 2008, publication date Jun. 28, 2011, which is assigned to the present assignees and is fully incorporated herein by reference.

BACKGROUND

1. Technical Field

This disclosure relates to thin film magnetic read/write heads and particularly to the design of a DFH (Dynamic Flying Height) slider air bearing surface (ABS) operating in a TAMR (thermally assisted magnetic recording) mode to achieve optimal management of thermal energy transferred to a recording medium.

2. Description

The present disclosure relates to a hard disk drive (HDD) that utilizes DFH (dynamic fly height) to control the distance between a read/write transducer and a magnetic medium and also applies thermally assisted magnetic recording (TAMR) to improve the writeability of that magnetic medium by locally heating (i.e., supplying thermal energy to) the region on which writing is to occur to reduce its coercivity and anisotropy. More specifically, the present disclosure relates to an air bearing surface (ABS) design for a slider that facilitates the management of that TAMR thermal energy and also improves the uniformity of touch-down detection. Although issues arising from the use of thermal energy to heat a magnetic recording medium have been discussed in the following prior arts, none of these teachings approach the issues in the manner to be presented herein. We refer to prior art teachings such as: Suzuki et al (U.S. Pat. No. 8,064,156), Song et al. (U.S. Pat. No. 7,428,124) and (U.S. Pat. No. 7,430,098), Wallash (US Publ. Pat. Appl. 2011/0128644), Hachisuka (U.S. Pat. No. 8,154,826) and (U.S. Pat. No. 8,081,398), Mochizuki (U.S. Pat. No. 8,264,512).

SUMMARY

It is a first object of this application to improve the dynamic stability of a TAMR slider.

It is a second object of this application to improve the dynamic stability of a TAMR slider while simultaneously providing improved thermal management.

It is a third object of this application to achieve the first two objects while achieving uniform touch-down detectability and back-off efficiency in all data zones by means of a topography that provides extremely low pressure/stiffness.

It is a fourth object of this application to achieve the first three objects while also providing a slider ABS topography that controls wear and damage due to thermal heating during extended periods of TAMR laser operation.

It is a fifth object of this application to provide flexibility in ABS design by enabling optimization of air-bearing pressure for enhanced thermal management and slider dynamical stability.

These objects will all be achieved by means of an ABS topography design for a slider such as is shown schematically in FIG. 3. This slider design provides extremely low pressure/stiffness, together with wear and damage resistance, yet would normally be expected to sacrifice dynamic stability. But we can enhance the dynamic stability by means of the incorporation of multiple heaters that are laterally disposed relative to the position of the read/write head. Therefore, we achieve the desired objects of retaining the low pressure/stiffness and associated improved detectability of touch downs together with the dynamic stability during the remaining portions of read/write operations.

BRIEF DESCRIPTION OF THE DRAWINGS

The objects, features, and advantages of the present disclosure are understood within the context of the Detailed Description as set forth below. The Detailed Description is itself understood within the context of the accompanying figures, wherein:

FIG. 6 is a set of three tables indicating the stiffness matrix (relationship between rows: load, pitch-torque and roll-torque, and columns: height, pitch and roll) for the nominal ABS design illustrated in FIG. 1 (Table 1), and for the present low pressure/stiffness ABS design incorporating one (Table 2) and three (Table 3) heaters respectively.

DETAILED DESCRIPTION

In a HDD, the data on a disk is read and written by a magnetic transducer (or read/write head), and each such transducer is embedded within a slider which is mounted on a suspension and flies over the rotating disk on a lubricating layer of air with a passive spacing of around 10 nm. During the read/write process, the active spacing is actually reduced, perhaps to below 1 nm, in order to achieve a higher areal density and disk capacity (eg. 1 Tbpsi). The current process of achieving such low fly heights, which is the so-called fly on demand (FOD) or dynamic fly height (DFH) process, controls magnetic spacing via the local thermal protrusion produced by activation of a heater embedded near the transducer. The absolute spacing between the read/write element and the medium surface is determined by first activating the heater sufficiently to bring the transducer into contact with the rotating medium and then reducing the activation and backing-off (BO) to a desired spacing that ensures reliable magnetic recording.

Many studies have been performed and techniques developed to accurately determine the contact point with the medium. The main difficulty in doing this is to overcome the hydro-dynamic air layer lubrication as the read/write elements are actuated towards the medium. With a decrease in spacing, the air pressure on the slider surface increases, which needs to be managed properly through innovative air-bearing surface designs or heater geometry. It is well known that the low pressure air-bearing designs promote excellent touch down detectability at the cost of poor slider dynamic stability, In addition, the state-of-the-art TAMR technology utilizes a laser to heat the media and enhance its writeability. The heat generated by the laser can induce serious head-disk interface (HDI) challenges. Air-bearing designs can be studied for better thermal management in TAMR applications through optimizing the pressure as shown in equ. (1) below:

$$q_{conduction} = \frac{-k(T_s - T_d)}{h(x, y) + 2b\lambda \frac{P_0}{P(x, y)}} \quad (1)$$

Where $q_{conduction}$ is the heat flux between the ABS of the slider and the medium as a result of the medium temperature being increased. In equ. (1), the terms are defined as follows:
k=heat conduction coefficient of gas between slider and medium
h(x,y)=slider to medium spacing;
P=air-bearing pressure
λ=mean free path
b=$(2(2-\sigma_T)\gamma)/(\sigma_T(\gamma+1))P_R)$, where:
$\sigma_T$=thermal accommodation coefficient, γ=specific heat ratio and $P_R$=Prandtl Number.

Figure 1:
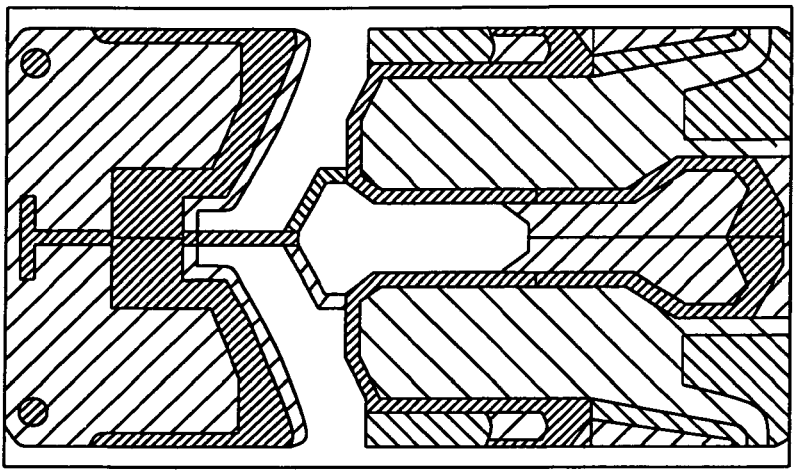
FIG. 1 is a schematic illustration of the ABS topography of a typical TAMR slider. This slider provides nominal pressure/stiffness during operation that will be taken as a baseline for discussion of two additional sliders. The various depths of the five-layered structure are indicated by shading density, from lightest/deepest, to darkest/shallowest.

In order to better understand the effect of pressure on thermal management (as indicated in equ. (1)) and touch down detection, three ABS designs have been fabricated and tested. FIG. 1 schematically illustrates the ABS topography of a typical slider currently in use by the industry.

Figure 2:
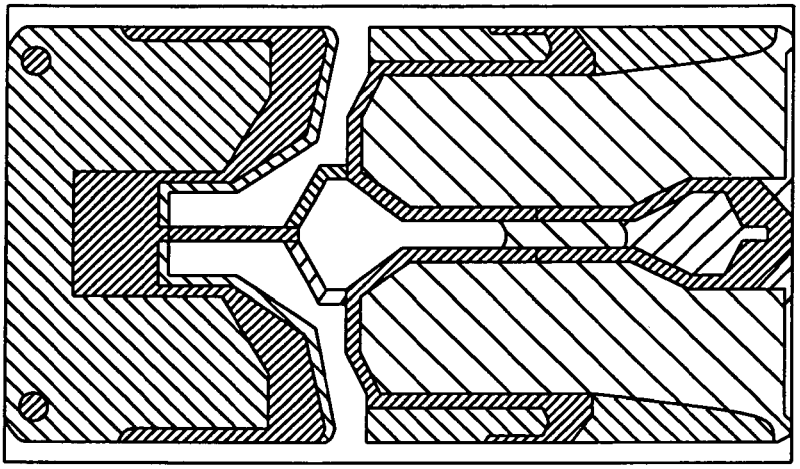
FIG. 2 is a schematic illustration of the ABS topography of a TAMR slider that provides extremely high pressure/stiffness as compared with the slider of FIG. 1. This slider enhances thermal conduction between itself and a medium. The various depths of the five-layered structure are indicated by shading density, from lightest/deepest, to darkest/shallowest.

FIG. 2 schematically illustrates the ABS topography of a slider that provides extremely high pressure/stiffness to enhance thermal conductivity (heat flux) between the slider and the medium as would be indicated by the previous equation.

Figure 3:
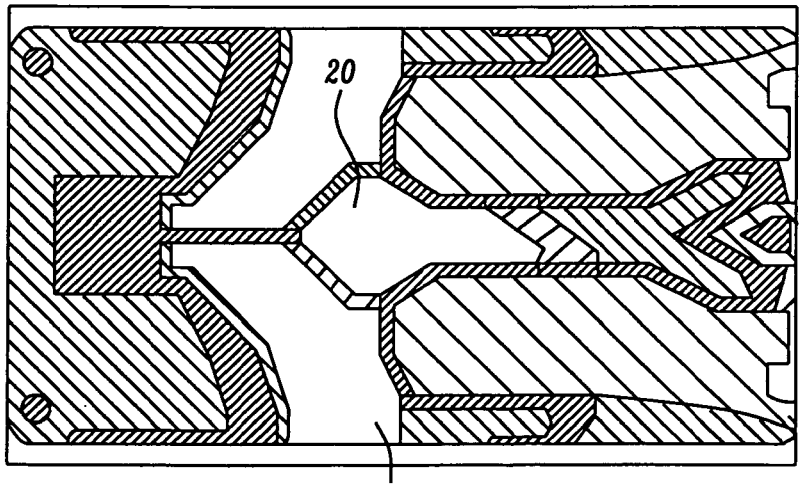
FIG. 3 is a schematic illustration of the ABS topography of the presently disclosed slider. This slider provides extremely low pressure/stiffness that provides enhanced touch down detection and allowing excellent wear and damage control during operation. The various depths of the five-layered structure are indicated by shading density, from lightest/deepest, to darkest/shallowest

FIG. 3 schematically illustrates the ABS topography of a slider that provides extremely low pressure/stiffness to enhance touch down detection and, therefore, in accordance with equ. (1), there is less heat transfer from the heated medium back to the head.

Upon testing these three designs, it was found that the slider of FIG. 3 performed best under TAMR operating conditions, in that SEM analysis showed the least amount of wear and damage after 16 Hr of flying time with the laser operating. These results indicate that a low pressure/stiffness air-bearing, such as provided by the slider of FIG. 3, may have merit for TAMR applications and that the slider dynamic instability associated with low pressure air-bearing designs need to be addressed in order to make such a slider a viable device for TAMR and DFH recording.

This disclosure, therefore, provides a TAMR slider for a HDD, supplemented with multiple heater elements for DFH operation and aerodynamic stability during HDD operation. The ABS topography of the slider combines excellent wear and damage prevention for the read/write element together with extremely low pressure/stiffness of the air-bearing layer. The low pressure/stiffness enhances touch down detection and the back-off process, which has a beneficial effect on wear and damage, while the heater arrangement provides controlled slider surface protrusion relatively far away from the read/write head itself for excellent dynamic stability (fly height, pitch and roll stability across the entire disk) during the remainder of HDD operation while the slider is flying above the rotating medium. Note that the stiffness matrix of FIG. 6, to be discussed below, shows an improved stiffness even in the z-direction.

Referring to schematic ABS planar diagram of FIG. 3, there is shown a proposed ABS topographical design of a TAMR slider that, without the supplementation of multiple heaters, provides excellent wear and damage protection for its read/write head together with extremely low pressure/stiffness to enhance touch down detection. A similar, but not identical slider topography, but lacking the present heater elements, is disclosed in U.S. Pat. No. 7,969,685, assigned to the present assignees and fully incorporated herein by reference. Without the supplementation of multiple heaters, however, such a slider would suffer from dynamic instabilities. In the figure, the same density of shading implies the same etch depth, with unshaded areas corresponding to layers formed by the deepest etch and the darkest shading representing the remainder of the uppermost (highest) ABS surface through which the deeper etches have penetrated. For clarity, a legend in the figure depicts the shading densities, from darkest to lightest, in order of increasing depth. Particular features to be noted are the deep cross-track channel (10), the down-track channel (20) with an asymmetric air-flow pattern leading to the central pad in which the read/write head and heaters are embedded. In particular, two deep channels surrounding the central pad diverts the air-flow and reduces the pressure against the pad which, in turn, reduces the stiffness.

Figure 4A:
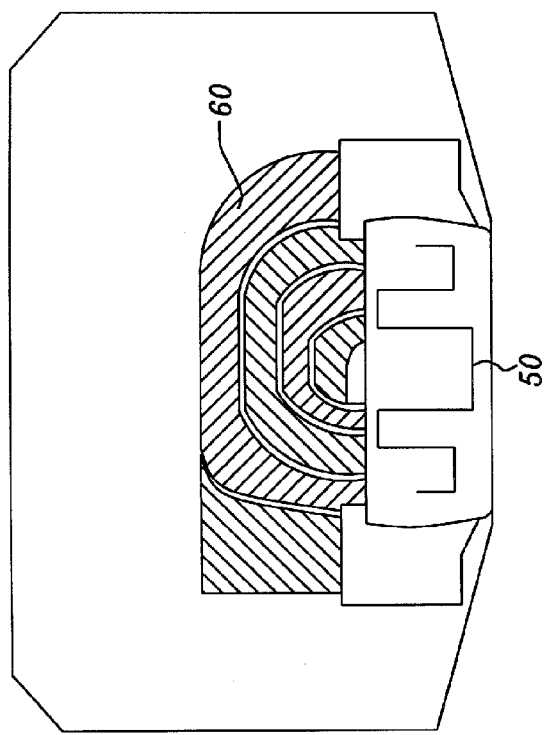
FIGS. 4a and 4b are each an enlargement of a portion of the schematic planar illustration of the air bearing surface (ABS) structure of the present slider showing the position of a single (4a) heater centrally placed and a total of three heaters (4b), including the single centrally placed heater of (4a) and two additional heaters, which may (or may not) be symmetrically placed adjacent to the write head portion of the slider in the cross-track direction.
Figure 4B:
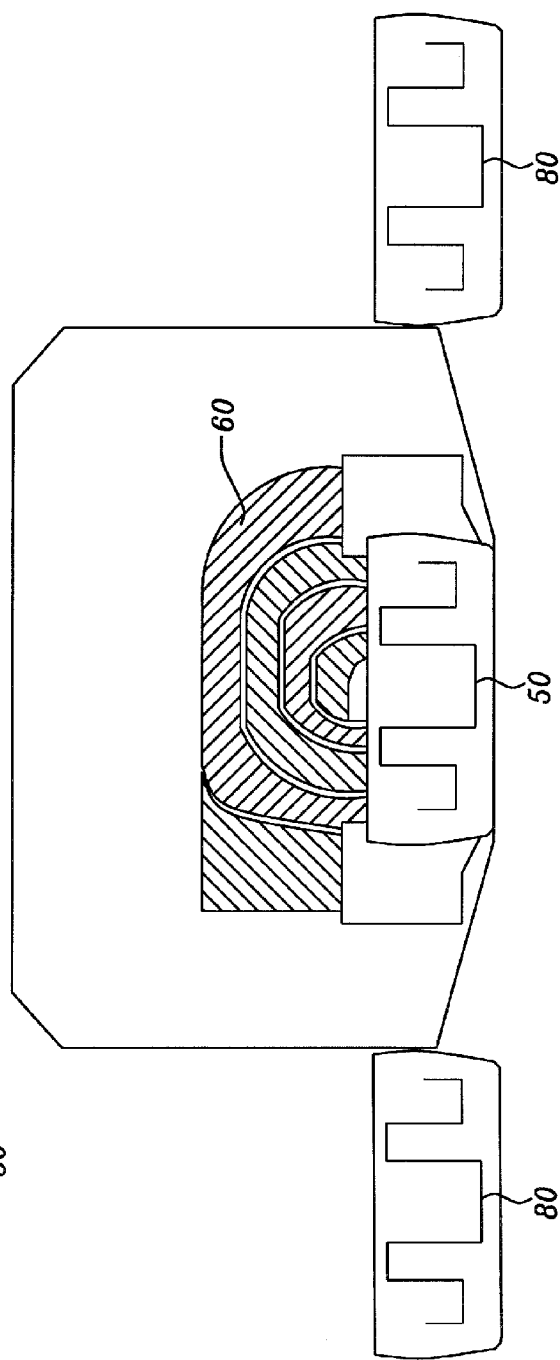

Referring now to FIG. 4a and FIG. 4b, there is shown in 4a the location of a single heater (50), disposed above the magnetic write coils (60) of the read/write head. The heater element is illustrated schematically as a single variable resistance element that can be formed as a portion having some given resistance per unit length, but whose total resistance can be made to vary in accord with its length. It should be understood that other forms and shapes of a resistive heating element are also possible.

Below the heater can be seen a portion (schematically illustrated) of the energizing coil (60) that produces the magnetic write field. Portions of the shields and coil insulation material are also shown schematically.

In FIG. 4b there are shown the locations of a multiple heater element, formed, in this example, as two (80) elements symmetrically disposed (about write-coil (60)) in the cross-track direction surrounding a single, centrally placed heater element (50) such as was shown as the only heater element in FIG. 4a. The symmetrical placement is exemplary and may be relaxed. The three heater elements are structurally similar, although they are positioned differently relative to the read/write head. A spacing between the outer elements and the central element of approximately 3.5 nm should provide adequate touch down detection and corresponding protection.

In the present slider, this multiple heater arrangement, as compared with the single heater, will provide additional air-bearing pressure by creating slider surface protrusions relatively far from either side of the read/write head and thereby enhance dynamic stability.

Figure 5A:
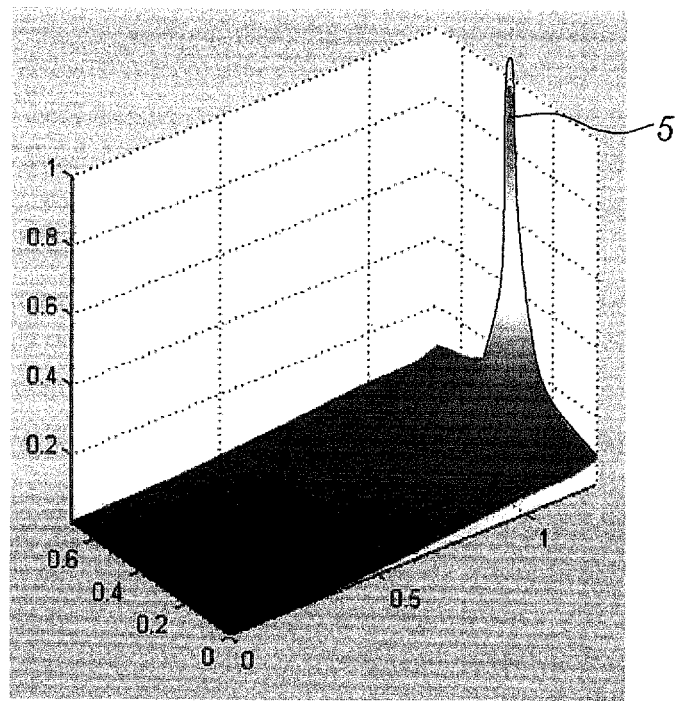
FIGS. 5a and 5b are schematic graphical representations showing the protrusion of the slider surface in the vicinity of the heaters shown in FIGS. 4a and 4b respectively.
Figure 5B:
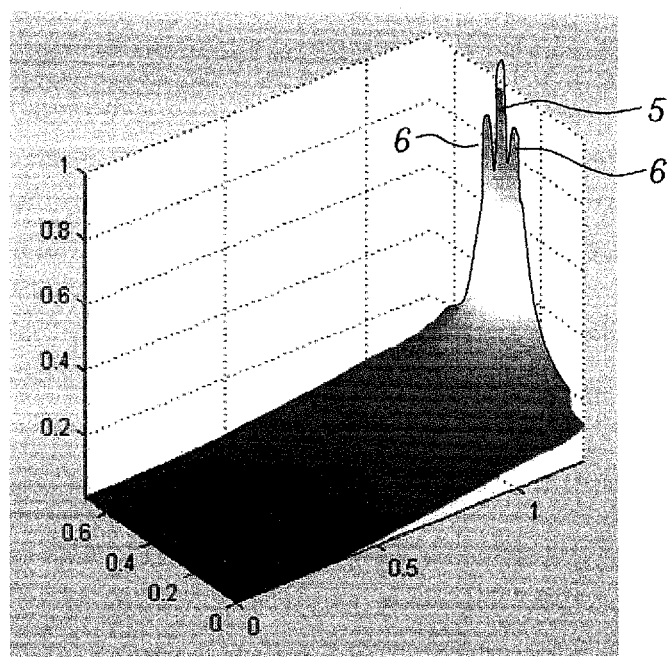

Referring next to FIGS. 5a and 5b, there are shown two schematic graphical representations of the local ABS protrusion profiles in the region of the ABS surrounding the location of an activated heater. In FIG. 5a there is shown the effects of the single heater shown in FIG. 4a. In FIG. 5b, there is shown the effects of the multiple heater arrangement (three heaters in this example) of FIG. 4b.

The protrusion profile in FIG. 5a shows a single sharp peak (5) centered on the location of the heater ((50) in FIG. 4a). The protrusion profile of FIG. 5b indicates a central protrusion peak (5) surrounding the central heater, with two lower peaks (6) displaced to either side of the central peak and relatively distant from the central peak for additional air-bearing pressure and enhanced stability. The ABS protrusion that is measured by the graph of FIG. 5b provides that slider with enhanced dynamic stability that would not be obtained by the protrusion peak of FIG. 5a, corresponding to the single heater arrangement shown in FIG. 4a.

Referring next to FIG. 6, there are shown three tables within that figure displaying the air-bearing stiffness matrices for the slider design of FIG. 1 (Table 1) and the low pressure ABS slider design (Tables 2 and 3) of FIG. 3, which is the design that meets the objects of this disclosure. Tables 2 and 3 refer to the dynamic properties of the low pressure slider when it is equipped with a single heater (Table 2) and with multiple heaters (Table 3). It is the results shown in Table 3 that provides an indication of the operating characteristics of a low pressure, multiple-heater slider that includes dynamic stability coupled with wear and damage resistance and the low pressure and low stiffness that produces excellent touch down characteristics.

Note that the entries in the matrices indicate changes in the load, pitch torque and roll torque when a unit of FH (fly height), pitch or roll is changed. The larger the absolute value of the entry, the greater is the associated stability. Note also that "ambient" refers to atmospheric pressure and "all spacings" refers to thermally induced spacings resulting from changes in DFH power from no power to full operational power.

As is understood by a person skilled in the art, the preferred embodiments of the present disclosure are illustrative of the present disclosure rather than being limiting of the present disclosure. Revisions and modifications may be made to methods, processes, materials, structures, and dimensions through which is formed a DFH type TAMR slider having enhanced touch down detectability and back off efficiency resulting from an extremely low pressure/stiffness ABS topography, while also having enhanced dynamic stability during HDD operation resulting from slider surface protrusion produced by multiple heaters disposed about the read/write head in the cross-track direction, while still providing such a DFH type TAMR slider, formed in accord with the present disclosure as defined by the appended claims.

What is claimed is:

1. A TAMR (thermal assisted magnetic recording) slider comprising:
    a TAMR apparatus for supplying thermal energy to heat a small region of a rotatable magnetic recording medium, whereby a writeability of said rotatable magnetic recording medium within said region is enhanced;
    a read/write element for writing on said rotatable magnetic medium; and
    multiple heater elements, including a first number of heater elements formed over said read/write element and a second number of heater elements variously disposed about said read/write element in a cross-track direction, said heaters providing DFH (dynamic fly height) operation to said slider and also providing dynamic stability during operation of said slider in a HDD (hard disk drive); wherein
    said slider has an ABS topography that provides low pressure/stiffness to enhance touch down detection and back-off capability; and wherein
    said slider is resistant to wear and damage resulting from touch downs and heat transfer from said TAMR heated recording medium.

2. The TAMR slider of claim 1 wherein said first number is 1 and said second number is 2.

3. The TAMR slider of claim 2 wherein said second number of heater elements is symmetrically disposed about said read/write element.

4. The TAMR slider of claim 1 wherein said ABS topography provides a low pressure/stiffness over a lubricating flow of air by means of surface structures including:
    a cross-track channel;
    a down track channel terminating at a pressure pad in which is embedded a read/write head surrounded by multiple heaters; wherein
    said down-track channel provides an asymmetric air flow into channels that divert said air flow around said pressure pad thereby reducing air pressure on said pressure pad and reducing the corresponding slider stiffness.

5. The TAMR slider of claim 1 wherein said low pressure/stiffness provides a reduction of heat flow from said TAMR heated magnetic recording medium back to said slider thereby reducing heat-induced damage to said slider.

6. The TAMR slider of claim 1 wherein said low pressure/stiffness enhances a sensitivity to an interaction between said slider and said magnetic recording medium, whereby touch-downs are more readily determined and wherein damage to said slider caused by poorly detected touchdowns is avoided.

7. The TAMR slider of claim 1 wherein said dynamic stability is provided by slider surface protrusion including a central protruding peak centered approximately about said read/write element and two subsidiary peaks, laterally disposed about said central peak and relatively distant from said read/write element.

8. The TAMR slider of claim 3 wherein a central heater element is disposed over said read/write head and two additional heater elements are laterally and symmetrically disposed to each side of said central heater element in a cross-track direction relative to said central heater.

9. The TAMR slider of claim 8 wherein each of said two additional heater elements is separated from said central heater element by approximately 3.5 nm.

10. The TAMR slider of claim 8 wherein all heater elements are fabricated from resistive conducting material having substantially identical resistance per unit length but varying in total resistance in accord with their individual lengths.

11. A hard disk drive (HDD) comprising:
    a rotatable magnetic recording medium;
    a TAMR slider, including an apparatus for supplying thermal energy to a small region of said rotatable magnetic recording medium, whereby a writeability of said rotatable magnetic recording medium within said region is enhanced;
    a read/write element embedded in said slider for writing on said rotatable magnetic medium; and
    multiple heaters, including a first number of heater elements formed over said read/write element and a second number of heater elements disposed about said read/write element in a cross-track direction, said heaters providing DFH (dynamic fly height) operation to said slider and also providing dynamic stability during operation of said HDD; wherein said slider has an ABS topography that provides low pressure/stiffness to enhance touch down detection and back-off capability; and wherein said slider is resistant to wear and damage resulting touch downs and from heat transfer from said heated recording medium.

12. The hard disk drive (HDD) of claim 11 wherein said first number is 1 and said second number is 2.

13. The hard disk drive (HDD) of claim 12 wherein said second number of heater elements is symmetrically disposed about said read/write element.

14. The hard disk drive (HDD) of claim 11 wherein said ABS provides a low pressure/stiffness over a lubricating flow of air by means of a topography including:

a cross-track channel;

a down track channel terminating at a pressure pad in which is embedded a read/write head surrounded by multiple heaters; wherein said down-track channel provides an asymmetric air flow into channels that divert said air flow around said pressure pad thereby reducing air pressure on said pressure pad and reducing the corresponding slider stiffness.

15. The hard disk drive (HDD) of claim 11 wherein said low pressure/stiffness provides a reduction of heat flow from said TAMR heated magnetic recording medium back to said slider thereby reducing heat-induced damage to said slider.

16. The hard disk drive (HDD) of claim 11 wherein said low pressure/stiffness enhances a sensitivity to an interaction between said slider and said magnetic recording medium, whereby touchdowns are more readily determined and wherein damage to said slider caused by poorly detected touchdowns is avoided.

17. The hard disk drive (HDD) of claim 11 wherein said dynamic stability is provided by slider surface protrusion including a central protruding peak centered approximately about said read/write element and two subsidiary peaks, laterally disposed about said central peak and relatively distant from said read/write element.

18. The hard disk drive (HDD) of claim 11 wherein a central heater element is disposed over said read/write head and two additional heater elements are laterally and symmetrically disposed to each side of said central heater element in a cross-track direction relative to said central heater.

19. The hard disk drive (HDD) of claim 11 wherein said two additional heater elements are laterally and symmetrically disposed to each side of said central heater element in a cross-track direction relative to said central heater by an amount that is approximately 3.5 nm.

20. The hard disk drive (HDD) of claim 11 wherein all heater elements are fabricated from resistive conducting material having substantially identical resistance per unit length but varying in total resistance in accord with their individual lengths.

* * * * *